United States Patent
US 10,367,241 B2
Enning et al.
Jul. 30, 2019

(54) RECEIVING DEVICE FOR RECEIVING AT LEAST ONE ENERGY STORAGE COMPONENT

(71) Applicant: AUDI AG, Ingolstadt (DE)

(72) Inventors: Norbert Enning, Denkendorf (DE); Bastian Guyot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 599 days.

(21) Appl. No.: 14/905,682

(22) PCT Filed: Jun. 12, 2014

(86) PCT No.: PCT/EP2014/001599
§ 371 (c)(1),
(2) Date: Jan. 15, 2016

(87) PCT Pub. No.: WO2015/007360
PCT Pub. Date: Jan. 22, 2015

(65) Prior Publication Data
US 2016/0172726 A1    Jun. 16, 2016

(30) Foreign Application Priority Data
Jul. 16, 2013 (DE) .................... 10 2013 011 895

(51) Int. Cl.
*H01M 10/6556* (2014.01)
*H01M 10/625* (2014.01)
(Continued)

(52) U.S. Cl.
CPC .......... *H01M 10/6556* (2015.04); *B60K 1/04* (2013.01); *H01M 2/1077* (2013.01);
(Continued)

(58) Field of Classification Search
None
See application file for complete search history.

(56) References Cited

U.S. PATENT DOCUMENTS 7,401,669 B2    7/2008  Fujii
8,573,647 B2    11/2013 Enning
(Continued)

FOREIGN PATENT DOCUMENTS

CN    1808751       7/2006
CN    101604735    12/2009
(Continued)

OTHER PUBLICATIONS

Chinese Search Report dated Mar. 31, 2017 with respect to counterpart Chinese patent application 201480040324.6.
(Continued)

*Primary Examiner* — Rena Dye Cronin
(74) *Attorney, Agent, or Firm* — Henry M. Feiereisen LLC

(57) ABSTRACT

The invention relates to a receiving device for receiving at least one energy storing component, includes at least one receiving part which delimits at least some sections of a receiving chamber for receiving the energy storing component. A coolant channel structure which includes at least one coolant channel is formed in at least some sections of the surface of the receiving part, wherein the coolant channel structure communicates with at least one coolant inlet and at least one coolant outlet.

12 Claims, 3 Drawing Sheets

(51) Int. Cl.
*H01M 10/613* (2014.01)
*H01M 2/10* (2006.01)
*H01M 10/617* (2014.01)
*B60K 11/02* (2006.01)
*B60K 1/00* (2006.01)
*B60K 1/04* (2019.01)
*B60K 11/06* (2006.01)

(52) U.S. Cl.
CPC ....... *H01M 10/613* (2015.04); *H01M 10/617* (2015.04); *H01M 10/625* (2015.04); *B60K 11/02* (2013.01); *B60K 11/06* (2013.01); *B60K 2001/005* (2013.01); *H01M 2220/20* (2013.01)

(56) References Cited

U.S. PATENT DOCUMENTS

| | | | |
|---|---|---|---|
| 2002/0012833 A1* | 1/2002 | Gow | H01M 2/0242 429/120 |
| 2009/0197154 A1* | 8/2009 | Takasaki | B60K 1/04 429/83 |
| 2009/0258289 A1* | 10/2009 | Weber | H01M 10/647 429/120 |
| 2011/0212355 A1* | 9/2011 | Essinger | H01M 2/1016 429/120 |
| 2012/0103714 A1 | 5/2012 | Choi et al. | |
| 2012/0129018 A1 | 5/2012 | Eckstein et al. | |
| 2012/0312614 A1 | 12/2012 | Fujuwara et al. | |
| 2012/0328916 A1 | 12/2012 | Enning | |
| 2013/0206528 A1 | 8/2013 | Enning et al. | |
| 2013/0207459 A1 | 8/2013 | Schröder et al. | |
| 2013/0250512 A1 | 9/2013 | Ludwig et al. | |
| 2014/0141311 A1 | 5/2014 | Michelitsch | |
| 2016/0156080 A1* | 6/2016 | Enning | H01M 2/1077 429/83 |

FOREIGN PATENT DOCUMENTS

| | | |
|---|---|---|
| DE | 198 49 491 | 10/1998 |
| DE | 2007 063 269 | 6/2009 |
| DE | 10 2008 034 885 | 1/2010 |
| DE | 10 2008 059 952 | 6/2010 |
| DE | 10 2008 059 955 | 6/2010 |
| DE | 10 2009 030 017 | 12/2010 |
| DE | 10 2010 039 149 | 2/2012 |
| DE | 10 2011 016 799 | 3/2012 |
| DE | 10 2011 084 000 | 5/2012 |
| DE | 10 2011 005 403 | 6/2012 |
| DE | 10 2010 080 813 | 2/2013 |
| DE | 10 2011 116 630 | 4/2013 |
| EP | 0 933 830 | 8/1999 |
| EP | 2 608 309 | 12/2011 |
| WO | WO2012/160573 | 11/2012 |
| WO | WO 2015/160573 | 11/2012 |
| WO | WO 2013/000900 | 1/2013 |

OTHER PUBLICATIONS

Translation of Chinese Search Report dated Mar. 31, 2017 with respect to counterpart Chinese patent application 201480040324.6.
International Search Report issued by the European Patent Office in International Application PCT/EP2014/001599.

* cited by examiner

RECEIVING DEVICE FOR RECEIVING AT LEAST ONE ENERGY STORAGE COMPONENT

CROSS-REFERENCES TO RELATED APPLICATIONS

This application is the U.S. National Stage of International Application No. PCT/EP2014/001599, filed Jun. 12, 2014, which designated the United States and has been published as International Publication No. WO 2015/007360 and which claims the priority of German Patent Application, Serial No. 10 2013 011 895.6, filed Jul. 16, 2013, pursuant to 35 U.S.C. 119(a)-(d).

BACKGROUND OF THE INVENTION

The invention relates to a receiving device for receiving at least one energy storage component, including at least one receiving part, which delimits at least regions of a receiving space for receiving the energy storage component.

Corresponding receiving devices for electric energy storages are known and generally serve for receiving or storing energy storage components, such as energy storage cells or electrical or electronic components connected or connectable with the energy storage cells, such as for example charge or control electronics. For this corresponding receiving devices typically have a receiving part, which delimits a receiving space for receiving the energy storage components.

As is known heat is generated during operation of such energy storage components, which has to be dissipated from the energy storage components and the receiving device receiving the energy storage components, in order to prevent overheating and possible damage resulting from the overheating to the energy storage component, the receiving device and other optional components mounted with the receiving device in a concrete application.

The use of separate cooling devices, which are connected to corresponding receiving devices offer the possibility of a cooling or tempering of corresponding energy storage components or receiving devices. However, a disadvantage of such cooling devices is their required mounting space.

The invention is therefore based on the object to provide an improved receiving device for receiving at least one energy storage component.

The object is solved according to the invention by a receiving device of the aforementioned type, which is characterized in that a coolant channel structure is formed in the surface of the receiving part at least in regions, which coolant channel structure includes at least one coolant channel and communicates with at least one coolant inlet and with at least one coolant outlet.

The receiving device according to the invention is thus characterized in that the receiving part, which delimits at least regions of the receiving space, is designed or constructed so that in its surface a coolant channel structure, which includes one or multiple coolant channels is formed. The coolant channel structure which is thus integrated in the receiving part or is formed by the receiving part itself makes it possible to conduct or circulate a coolant, i.e., for example a liquid or gaseous fluid, along the surface of the receiving part in a concentrated manner. The coolant channel, or coolant channels comprised by the coolant channel structure, is or are typically arranged so that the coolant can flow or be circulated in the manner of a circulation along the surface of the receiving part. The coolant flowing or circulating along the surface of the receiving part can thus be brought as close as possible to an energy storage component(s) to be cooled arranged inside the receiving space, so as to enable a good heat exchange between the coolant and the energy storage component(s) to the be cooled and thus a high efficiency.

The coolant channels comprised by or delimited by the coolant channel structure can be open or closed, depending on the type of the coolant flowing or circulating through them, i.e., in particular depending on whether it is a gaseous or liquid coolant. In an open configuration, the coolant can exit from the coolant channel structure into the receiving space and thus directly reach the energy storage components to be cooled. The open configuration of the coolant channel structure or the coolant channels is preferably provided when using a gaseous coolant. The gaseous coolant can for example be a correspondingly tempered carbon dioxide. On the other hand in case of a closed configuration the coolant is spatially separated from the energy storage components to be cooled so that it cannot directly reach the energy storage components to be cooled. The closed configuration of the coolant channel structure or the coolant channels is preferably provided when using a liquid coolant. The liquid coolant can for example be a tempered liquid such as water, a watery solution or oil.

Generally it is conceivable that the entire surface of the receiving part is provided with a corresponding coolant channel structure. It is also conceivable, however, that only certain regions of the surface of the receiving part are provided with a corresponding coolant channel structure. The coolant channel structure can also be divided into multiple separate coolant channels, which respectively cover different regions of the surface of the receiving part. In all cases the coolant channels associated with the coolant channel structure communicate directly or indirectly, i.e., in particular via further coolant channels communicating with the latter, with a coolant inlet and a coolant outlet. Hereby it is useful when the arrangement of the coolant channels is such that the coolant flows through them in opposite directions. For all variants the coolant channel structure or the associated coolant channels preferably extend meander-shaped.

Generally the coolant channel structure thus communicates with at least one coolant inlet and at least one coolant outlet, via which a coolant is introduced into the coolant channel structure or in particular after passing through the coolant channel structure, can be removed from the coolant channel structure.

The arrangement of the coolant inlet, the coolant outlet and also the coolant channel structure communication with the coolant outlet and the coolant inlet is selected so as to result in a most homogenous cooling for all energy storage component to be cooled and to be received or being received in the receiving part. This can for example be achieved in that the coolant inlet and the coolant outlet are arranged at a centered position relative to a longitudinal axis of the receiving part. In this arrangement, coolant enters the coolant channel structure with a low temperature and after passing through the coolant channel structure, heated coolant exits the coolant channel structure at a centered position with a relatively high temperature. It is thus possible to compensate the comparatively low cooling efficiency of the coolant which is heated up after passing through the coolant channel structure, because in its exit region the coolant extends at least in regions adjacent, in particular parallel, to the entry region of the not yet heated coolant.

The coolant channel structure can be formed in the surface of the receiving part using different technical approaches. On one hand the coolant channel structure can be formed by shaping the receiving part, i.e., in particular by a step, which imposes a shape on the receiving part during production of the receiving part. This variant in particular applies to receiving parts, which are produced via casting methods, such as injection molding methods, i.e., from castable, in particular injectable materials. In this context it is also conceivable to form the receiving part from an injectable thermoplastic plastic such as ABS, PE, PP or a castable thermoset plastic material. In both cases it is conceivable that the plastic material contains reinforcement fibers, such as aramid, glass or carbon fibers. The receiving part can alternatively also be made of an injectable or castable metal such as for example aluminum or magnesium.

On the other hand, the cooling channel structure can also be formed in the surface of the receiving part by mechanical processing or a material removal, i.e., for example by machining, generally material removing processes, eroding etc. The coolant channel structure can thus be formed subsequent to the actual production of the receiving part. The selection of materials for the receiving part in this embodiment is only limited by the fact that the material selected for forming the receiving part has to be capable of being correspondingly processed. Also in this embodiment the receiving part can be made of a plastic material or a metal.

The geometric shape, i.e., in particular the cross section of the coolant channels, is generally freely selectable. For example the coolant channels can have a semicircular, V-shaped, or U-shaped cross section. The cross section of the coolant channels can change or be different in sections along their longitudinal extent.

The geometric shape of the receiving part can generally be free selected or is selected with regard to an application or installation situation for the entire receiving device, for example an installation situation in a motor vehicle. However, an embodiment of the receiving part is useful which has a trough or tub shape. The receiving part has thus preferably a base area with borders, which protrude from the base area at an angle, in particular a right angle. The shape of the base area can again be freely selected, i.e., in particular with regard to the type of application or installation situation of the entire receiving device. The base are and in particular also the height of the borders protruding from the base area, define the volume of the receiving space delimited by the receiving part. The height of the borders of the receiving part can be understood as a degree to which the receiving part delimits the receiving space. Generally it is thus conceivable that the receiving part entirely delimits the receiving space so that in order to fully close the receiving space a cover or closure part is to be attached to the receiving part. However, as discussed below, the receiving device can include further receiving parts, which together with the trough-shaped receiving part delimit the receiving space.

As mentioned the coolant channel structure or the coolant channels associated therewith can be configured closed. This can for example be realized in that the coolant channel structure is covered by at least one plate-shaped cover element. The plate-shaped cover element thus seals or covers the coolant channels towards the top relative the surface of the receiving part. The dimensions and the shape of the plate-shaped cover element are typically adapted to the dimensions and the shape of the receiving part, i.e., in particular to the dimensions and the shape of the base area of the receiving part, so that the cover element can be inserted into the receiving part so as to at least cover a portion of the coolant channel structure. Hereby in particular the region of the coolant channel structure is covered in which the energy storage components will be or are arranged. The plate-shaped cover element can for example be a plan plate made of a plastic material or metal. The configuration using metal is preferred because metal has a comparatively better thermal conductivity, which facilitates heat transfer from the energy storage components to be cooled to the cover element and the coolant flowing in the coolant channel structure.

The at least one coolant inlet and the at least one coolant outlet are typically formed in the plate-shaped cover element. The at least one coolant inlet and also the at least one coolant outlet are for example formed as connection ports, which are in particular configured integral with the plate-shaped cover element.

The plate-shaped cover element is advantageously connected with the surface of the receiving part via at least one connecting point. Of course also a partial of full-surface connection of the cover element with the surface of the receiving part is possible. The connection, i.e., in particular the configuration of the connecting points, can be accomplished via gluing or welding. Conceivable are also mechanical connections, such as flanging, riveting, or screwing, in order to generate a connection between the cover element and the surface of the receiving element.

In an advantageous refinement of the invention, the coolant inlet and the coolant outlet are arranged in a separate region of the plate-shaped cover element, which is spatially separated from the region that delimits the receiving space. This ensures that the coolant inlet and the coolant outlet are arranged in a region of the plate-shaped cover element which is regularly located spaced apart from the regions of the receiving part that delimit the receiving space, so that this region is free also when the receiving space is covered by a lid or closure element and therefore well accessible.

As mentioned the receiving part can for example be made of a plastic material or metal. Both materials or material groups are characterized by specific advantages. Thus a plastic material offers for example a relatively high thermal and electric insulation. On the other hand a metal offers for example a relatively high mechanical stability. The actual material is therefore selected depending on the demands placed on the receiving device. Hereby in particular the installation situation of the receiving device within a greater constructive context is to be taken into account.

According to a further advantageous embodiment of the invention, the receiving part forms a bottom surface of the receiving device. In this embodiment a frame-like further receiving part is provided which forms a plurality of side surfaces of the receiving device which also delimit the receiving space, in which frame-like receiving part multiple receiving compartments are formed for receiving in an exact fit, or even form fit, at least one energy storage component, in particular at least one energy storage cell and/or an electronic component connectable or connected with at least one energy storage cell. The further receiving part can be understood as a carrier structure for corresponding energy storage components to be inserted in to the receiving device. The receiving compartments are adapted in number, dimensions and shape to the number, dimensions and shapes of the respective energy storage component to be inserted into the receiving compartments.

The receiving compartments formed in the further receiving part are typically formed by bridges or webs, which in particular extend perpendicular to each other. The respective receiving compartments can typically be open in vertical direction on both sides so that the receiving compartments are typically vertical perforations or openings of the receiving part. However, it is also conceivable that the or defined ones of the receiving compartments are not fully open in vertical direction, but are rather formed as recesses or indentations. The bottom surface of these recesses can be aligned with the bottom surface of the further receiving part, which is understood as the surface of the further receiving part with which it rests on a horizontal support surface. However, it is also conceivable that the bottom surface of these recesses is situated elevated relative to the bottom surface of the further receiving part. As mentioned the further receiving part can thus typically be a frame-like component. As mentioned the further receiving part forms a holding and/or carrier structure for the energy storage component to be received in it, which can typically be energy storage cells and electric and/or electronic components connected with the energy storage cells, such as for example a charge- or control device, which controls the charge and discharge operation of the energy storage cells.

The further receiving part typically is a metallic die cast part. Correspondingly the further receiving part can preferably be made of materials such as aluminum, magnesium or titanium. Metallic die cast parts offer excellent mechanical properties so that the mechanical stability of the receiving device can overall be increased by forming the further receiving part as die cast part. Of course it is generally also conceivable to configure the further receiving part not as a metallic die cast part, but for example as component made of ceramic or plastic.

In order to fully close or seal the receiving space delimited by the receiving part and optionally the further receiving part, a cover or closure part can be provided via which the receiving space can be closed toward at least one open side. The correct arrangement or connection of the closure part with the receiving part(s) thus result in a sealing and protection of the energy storage components received in the receiving space against mechanical a corrosive influence.

BRIEF DESCRIPTION OF THE DRAWING

Further advantages, features and details of the invention will become apparent form the exemplary embodiments described below and form the drawings. It is shown in.

DETAILED DESCRIPTION OF PREFERRED EMBODIMENTS

Figure 1:
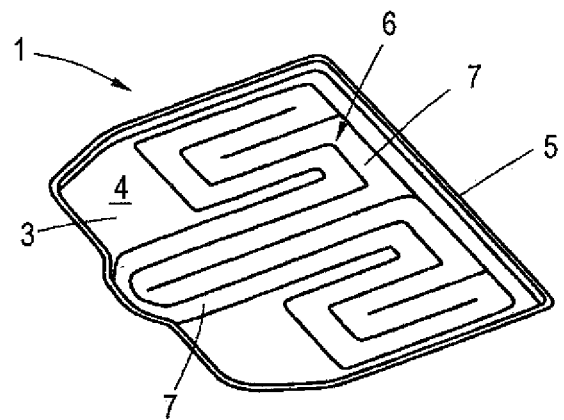
FIGS. 1-5 each a receiving device according to an exemplary embodiment of the invention.

FIG. 1 shows a receiving device 1 according to an exemplary embodiment of the invention. The receiving device 1 serves for receiving energy storage components 2. FIG. 1 illustrates that the receiving device 1 has a receiving part 3. The receiving part 3 is configured trough-shaped with a base area 4 and borders 5 perpendicularly protruding from the base area 4. In this way a portion of the receiving space of the receiving device 1 is formed in the receiving part for receiving corresponding energy storage components 2. The receiving part 3 therefore delimits regions of the receiving space of the receiving device 1. The receiving part 3 is a component made from a thermoplastic plastic material, such as PP, filled with reinforcement fibers, in particular glass fibers, by an injection molding process.

Figure 4:
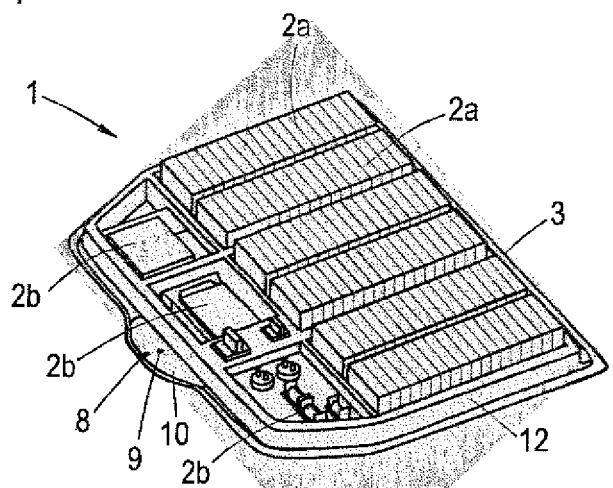
Figure 5:
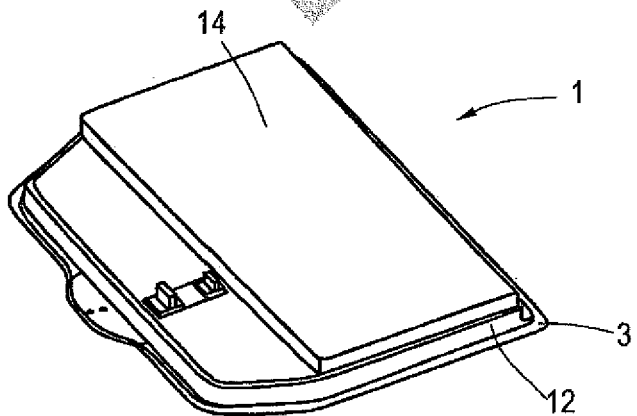
Figure 8:
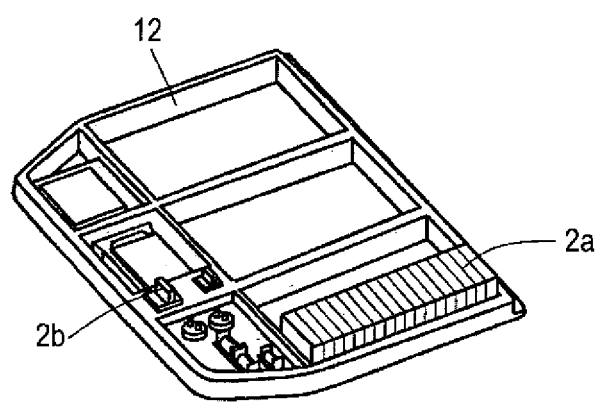
FIG. 8 an individual view of the further receiving part shown in FIGS. 3, 4.

As shown in FIGS. 4, 5 and 8 the receiving device 1 serves for receiving different energy storage components 2. The energy storage components 2 can be in particular energy storage cells 2a and electronic components 2b, such as for example a charge- or control electronics, which controls the charge and discharge operation of the energy storage cells 2a. All energy storage components 2 form an electric energy storage or a battery. The receiving device 1 can be understood as a housing for the energy storage. The receiving device 1 is typically installed in a motor vehicle. The energy storage components 2, i.e., in particular the energy storage formed by them, received in the receiving device 1 serves for supplying high-voltage and/or low-voltage loads of the motor vehicle with electric energy.

Figure 6:
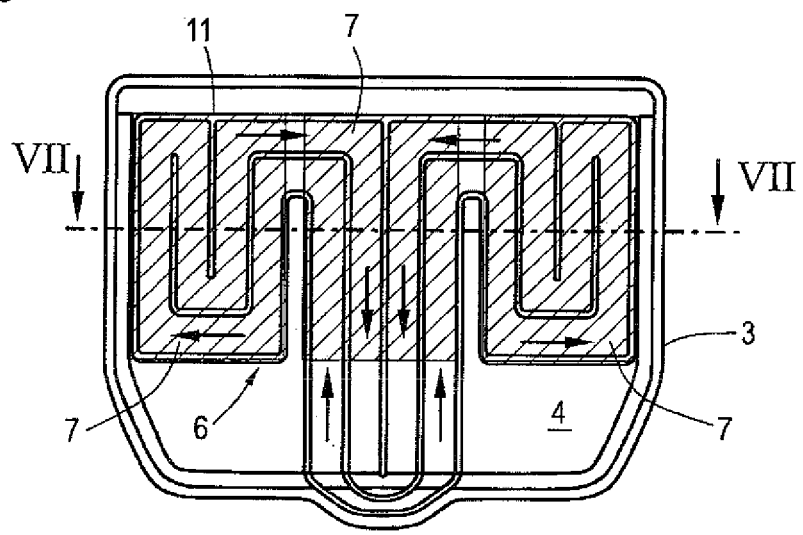
FIG. 6 a top view onto the receiving device shown in FIG. 1.

As can be seen from FIGS. 1, 5 and 6, a coolant channel structure 6 is formed in the surface of the receiving part 3, i.e., in particular the surface of the base area 4 of the receiving part 3. The coolant channel structure 6 includes multiple, coolant channels 7 which extend meander-like and which are formed by groove or gully-like indentations in the surface. The coolant channel structure 6 or the coolant channels 7 can be formed during production of the receiving part 3. It is also generally conceivable to introduce the coolant channel structure 6 or the coolant channels 7 by material removing processes into the surface of the receiving part 3.

As discussed in the following a coolant, i.e., for example a cooling gas or a cooling liquid, in particular water or mixtures of water and other liquids such as glycol, flows through the coolant channel structure 6 formed in the surface of the base area of the receiving part 3. The coolant is introduced via a coolant inlet 8 arranged in a region of a plate shaped cover element 10, which extends from a center section of the base area 4. In the region of the coolant inlet 8 a coolant outlet 9 is further provided via which the coolant, which has flowed through the coolant channel structure 6, can exit from the coolant channel structure 6 and with this from the receiving part 3. The coolant inlet 8 and the coolant outlet 9 are respectively connection sockets, which can be integrally formed with the plate-shaped cover element 10. Overall a coolant can therefore flow through the coolant channel structure 6 in the manner of a circulation, thus ensuring a sufficient cooling of the energy storage components 2 received in the receiving device 1 during operation and with this the energy storage formed by the latter.

The flow of the coolant through the coolant channels 7 or through the coolant channel structure 6 is illustrated in FIG. 6. The flow of the coolant inside the coolant channels 7 or the coolant channel structure 6 in opposite directions is indicated by arrows.

The arrangement of the coolant inlet 8 and the coolant outlet 9 and the symmetric arrangement and the extension of the coolant channels 7 is selected so as to ensure a homogenous cooling of the energy storage components 2 to be cooled. In FIG. 6 exemplary arrangement regions of energy storage cells 2a to be received in the receiving device 1 are indicated with hatched surfaces. As a result of the flow of the coolant through the coolant channel structure 6 in opposite directions, indicated by the arrows, the energy storage cells 2a are therefore cooled homogenously. The energy storage cells 2a arranged in FIG. 6 in the region of the centered hatched surface are cooled with equal parts of coolant having the relatively low entry temperature and coolant having the relatively warm exit temperature. For the energy storage cells 2a arranged in the region of the upper and lower hatched surfaces the temperature difference of the coolant streams flowing in opposite directions is reduced so that on average a mostly homogenous cooling of all energy storage cells 2a can be realized.

Figure 2:
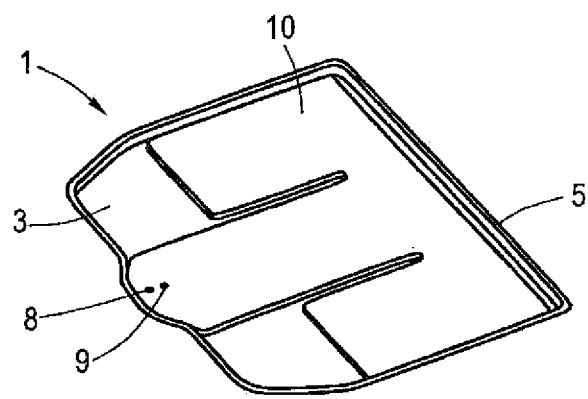
Figure 7:
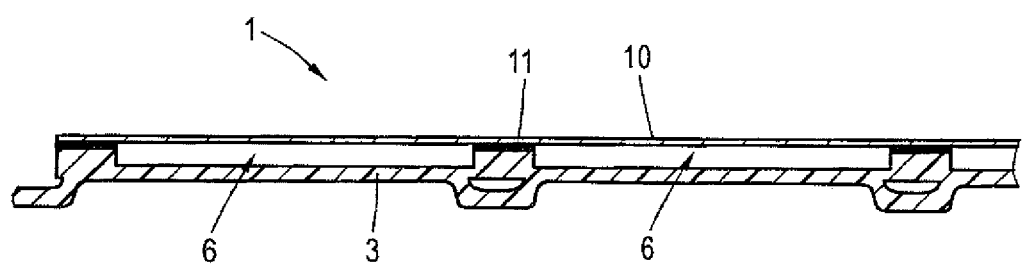
FIG. 7 a section along the sectional lines VI-VI shown in FIG. 6.

In order to prevent the coolant flowing in the coolant channels 7 and with this in the coolant channel structure 6 from exiting within the receiving part 3 from the coolant channels 7 or the coolant channel structure 6 and thus contact the energy storage components 2 to be cooled, the cooling channels 7 are covered on the top via the already mentioned plate-shaped cover element 10 in form of a metallic plate made of a thermally well conductive metal, such as aluminum (see FIG. 2, 7). The cover element 10 is for example fixedly connected with the base area 4 of the receiving part 3 via an adhesive connection (see FIG. 7, glue regions 11).

Figure 3:
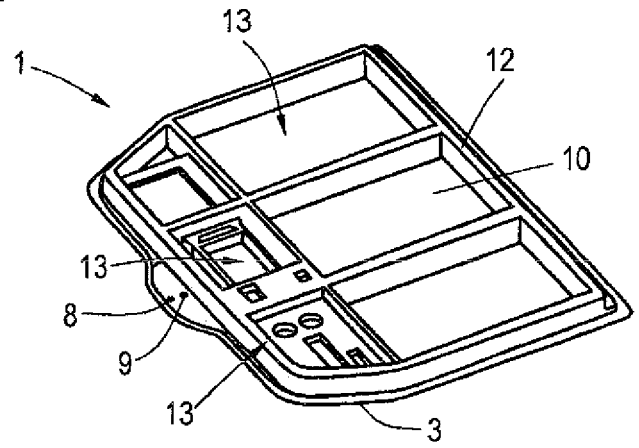

In the exemplary embodiment shown in FIG. 3, a further receiving part 12 is attached onto the exemplary embodiment shown in FIG. 2, i.e., the trough-shaped receiving part 3. The receiving part 3 thus forms a bottom surface or the bottom of the receiving device 1, while the further receiving part 12 forms respective side surfaces of the receiving device 1. Thus the first receiving part 3 delimits the receiving space of the receiving device 1 in particular in the region of the bottom, while the further receiving part 12 delimits the receiving space of the receiving device 1 in particular laterally. The further receiving part 12 is a metallic die cast part made of aluminum or magnesium or corresponding metallic alloys. The further receiving part 12 is thus mechanically very stable and therefore offers a good protection of the energy storage components to be arranged in it against mechanical stress.

The further receiving part 12 has a frame-like shape and can be understood as carrier structure for the energy storage components 2 to be arranged therein (see FIG. 8). The frame-like shape of the further receiving part 12 results from corresponding receiving compartments 13 formed in the further receiving part 12. The receiving compartments 13, which are formed respectively as vertical perforation of the horizontally extending base plane of the further receiving part 12, serve respectively for receiving one or multiple defined energy storage components 2, i.e., in particular at least one energy storage cell 2a and/or at least one electronic component 2b in an the exact fit, or even in a form fit. Thus the dimensions of the respective receiving compartment 13 are adapted to the dimensions of respective energy storage components 2 to be received in the receiving compartments. The comparatively greater receiving compartments 13 situated on the right hand side of a center divide serve for receiving energy storage cells 2a, the comparatively smaller receiving compartments 13 situated in FIG. 3 on the left hand side of the center divide, serve for receiving electronic components 2b.

The arrangement of corresponding energy storage components 2 inside the receiving compartments 13 and thus the further receiving part 12 and with this the receiving device 1 with mounted corresponding energy storage components 2 is shown in FIG. 4. FIG. 4 further shows that the arrangement of the receiving compartments 13 is selected so that all energy storage components 2 to be arranged in the receiving compartments 13, which require cooling during operation, rest with their bottom side directly on the cover element 10 so that via the cover element 10 a heat transfer to the coolant flowing in the coolant channel structure or the cooling channels 7 of the cooling channel structure 6, is possible.

FIG. 5 shows that the arrangement of a closure part 14 on the receiving device 1 shown in FIG. 4 enables a complete covering and with this enclosure of the energy storage components 2 arranged in the receiving space or the receiving compartments 13. The energy storage components 2 or the energy storage formed by them, received in the receiving device 1 is thus completely sealed and protected towards the outside, i.e., against external in particular mechanical and corrosive influences.

The connection of the receiving part 3, the further receiving part 12 and the closure part 14 is accomplished via gluing, thus resulting in a sufficient, in particular immersion-proof, sealing of the energy storage components 2 situated in the receiving space formed in the receiving device 1. The gluing is accomplished with a hot melt adhesive, which can be solubilized by applying heat, for example by means of a heated wire. As a result, service and repair work for example on the energy storage components 2 can be conducted.

Only in the region of the electric connections, i.e., in particular electronic components 2b which represent a high-voltage and a low-voltage connection, which can be seen in FIG. 5, a recess is provided inside the closure part 14 so that a proper electric contacting or connection of the energy storage components 2 or the energy storage formed by them with a corresponding application, i.e., in particular a motor vehicle or corresponding electric loads of the motor vehicle is possible.

FIG. 5 further shows that the coolant inlet 8, and the coolant outlet 9 are arranged in a separate region of the plate-shaped cover element 10, which is spatially separated from the regions that delimit the receiving space. The coolant inlet 8 and the coolant outlet 9 are therefore exposed so as to be well accessible.

FIGS. 1-5 show that the receiving device 1 can be assembled from multiple components, i.e., the receiving part 3, the further receiving part 12 and the closure part 14 in a modular fashion.

Important advantages of the receiving device 1 shown in the Figs. are that due to their mechanical stability they can also be arranged or installed in regions of a motor vehicle which are subject to stress for example in the region of the underbody. The coolant channel structure 6 directly integrated in the receiving part 3 ensures a sufficient cooling of all energy storage components 2, in particular also corresponding electronic components 2b. All electric or electronic connections and also connections for the supply and discharge of the coolant are integrated in the receiving device 1 in a space-efficient manner and are well accessible.

The invention claimed is:

1. A receiving device for receiving at least one energy storage component, said receiving device comprising:
   at least one receiving part, which delimits at least regions of a receiving space; and
   a coolant channel structure formed in the surface of the receiving part at least in regions of the surface, said coolant channel structure comprising at least one coolant channel extending meander-shaped in a symmetrical arrangement such that coolant flows through the at least one coolant channel in opposite directions, and communicating with at least one coolant inlet and with at least one coolant outlet both arranged at a centered position relative to a longitudinal axis of the at least one receiving part,
   wherein the receiving device and the at least one receiving part share a common base area with a trough-shape, said trough-shape formed by borders which protrude perpendicularly from the base area of the receiving part such that the base area and borders define a volume of the receiving space delimited by the receiving part, wherein the borders are separate from the coolant channel structure.

2. The receiving device of claim 1, wherein the coolant channel structure is formed during a shaping and/or material removing processing of the receiving part.

3. The receiving device of claim 1, further comprising at least one plate shaped cover element covering the coolant channel structure.

4. The receiving device of claim 1, wherein the cover element is connected with the surface of the receiving part via at least one connection point.

5. The receiving device of claim 3, wherein the coolant inlet and the coolant outlet are formed in a region of the cover element, which is spatially separate from regions which delimit the receiving space.

6. The receiving device of claim 1, wherein the coolant channel structure is formed so as to extend meander-shaped at least in sections along the surface of the receiving part.

7. The receiving device of claim 1, wherein the receiving part is made of a plastic or metal.

8. The receiving device of claim 1, further comprising a further receiving part, wherein the receiving part forms a bottom surface of the receiving device and the further receiving part forms side surfaces of the receiving device which delimit the receiving space, wherein a plurality of receiving compartments are formed in the further receiving part for receiving at least one energy storage component in an exact fit.

9. The receiving device of claim 8, wherein the at least one energy storage component includes at least one energy storage cell and/or an electronic component electrically connected with the at least one energy storage cell.

10. The receiving device of claim 8, wherein dimensions of the respective ones of the receiving compartments are adapted to dimensions of respective ones of the energy storage components to be received in the respective receiving compartments.

11. The receiving device of claim 8, wherein the further receiving part is a metallic die cast part.

12. The receiving device of claim 1, further comprising by a closure part configured for closure of the receiving space towards at least one open side.

* * * * *